United States Patent
Broz et al.

(10) Patent No.: US 9,817,681 B2
(45) Date of Patent: Nov. 14, 2017

(54) REAL-TIME DEVICE SETTINGS USING KNOWLEDGE BASE

(71) Applicant: International Business Machines Corporation, Armonk, NY (US)

(72) Inventors: Michal Broz, Austin, TX (US); Steven D. Clay, Austin, TX (US); Richard S. Schwerdtfeger, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/706,017

(22) Filed: May 7, 2015

(65) Prior Publication Data

US 2016/0328246 A1 Nov. 10, 2016

(51) Int. Cl.
*G06F 1/00* (2006.01)
*G06F 9/445* (2006.01)
*G06N 5/02* (2006.01)

(52) U.S. Cl.
CPC ........... *G06F 9/44505* (2013.01); *G06N 5/02* (2013.01)

(58) Field of Classification Search
CPC .............................. G06F 9/44505; G06F 9/4451
See application file for complete search history.

(56) References Cited

U.S. PATENT DOCUMENTS

| | | | | |
|---|---|---|---|---|
| 8,719,908 B1 * | 5/2014 | Boniface | ............. | H04L 63/0823 713/156 |
| 9,087,146 B2 * | 7/2015 | Rusu | ................... | G06F 11/3409 |
| 2008/0235611 A1 * | 9/2008 | Fraley | ................. | G06F 9/44505 715/772 |
| 2010/0162024 A1 * | 6/2010 | Kuris | ................... | G06F 11/3062 713/340 |
| 2011/0029665 A1 * | 2/2011 | Wenig | ..................... | H04L 67/22 709/224 |
| 2012/0215446 A1 * | 8/2012 | Schunder | ............... | G07C 5/008 702/3 |
| 2012/0245952 A1 | 9/2012 | Halterman et al. | | |
| 2012/0297050 A1 | 11/2012 | Frank et al. | | |
| 2012/0297174 A1 * | 11/2012 | Frank | .................... | G06F 9/5011 713/1 |
| 2013/0268935 A1 * | 10/2013 | Paul | ..................... | G06F 9/44552 718/100 |
| 2014/0032938 A1 * | 1/2014 | Greenberg | ................ | H02J 1/00 713/300 |

(Continued)

FOREIGN PATENT DOCUMENTS

| | | |
|---|---|---|
| WO | 2010131259 A2 | 11/2010 |
| WO | 2011087805 A2 | 7/2011 |
| WO | 2011153040 A2 | 12/2011 |

*Primary Examiner* — Aurel Prifti

(74) *Attorney, Agent, or Firm* — Jordan IP Law, LLC

(57) ABSTRACT

Methods, systems, and computer program products relate to recommending settings include collecting operating parameter and usage condition data for a plurality of electronic devices from one or more databases, analyzing the data to create a predictive model to estimate predicted operating parameters based on usage conditions, applying current device usage conditions from a current device to the predictive model to determine recommended device settings, and changing current device settings based on the recommended device settings.

20 Claims, 2 Drawing Sheets

(56) References Cited

U.S. PATENT DOCUMENTS

| | | | | |
|---|---|---|---|---|
| 2014/0149753 A1* | 5/2014 | Park | ............... | G06F 1/206 |
| | | | | 713/300 |
| 2014/0282520 A1* | 9/2014 | Sabharwal | ............ | G06F 9/455 |
| | | | | 718/1 |
| 2014/0310031 A1* | 10/2014 | Ricci | ............... | B60Q 1/00 |
| | | | | 705/5 |
| 2015/0286262 A1* | 10/2015 | Park | ............ | G05D 23/1917 |
| | | | | 713/320 |
| 2015/0358810 A1* | 12/2015 | Chao | ............ | H04W 4/001 |
| | | | | 455/418 |

* cited by examiner

REAL-TIME DEVICE SETTINGS USING KNOWLEDGE BASE

BACKGROUND

Embodiments of the present invention generally relate to generating real-time device settings. More particularly, embodiments relate to analysis of a knowledge base for real-time device settings.

An electronic device may provide manufacturer's settings for overheat management, power management, notifications, alarms, etc. The values for the settings, however, may be typically based on operation parameters determined in a lab for a new device. As the device ages, the hardware may deteriorate, which may cause the operation parameters to change dramatically. For example, the battery life of a new device may be five hours, but diminishes to three hours after two years. Similarly, a global positioning system (GPS) chip in a new device may detect a signal in thirty seconds, but it may take more than two minutes after two years. Therefore, a device may need to be adjusted or calibrated after shipment and continued use so that it can more accurately reflect the current conditions of the device.

BRIEF SUMMARY

Embodiments may include a method to determine device settings including collecting operating parameter and usage condition data for a plurality of electronic devices from one or more databases, analyzing the data to create a predictive model to estimate predicted operating parameters based on usage conditions, applying current device usage conditions from a current device to the predictive model to determine recommended device settings, and changing current device settings based on the recommended device settings.

Embodiments may also include a computer program product to determine device settings, the computer program product comprising a computer readable storage medium having program instructions embodied therewith, the program instructions executable by a computer to cause the computer to collect operating parameter and usage condition data for a plurality of electronic devices from one or more databases, analyze the data to create a predictive model to estimate predicted operating parameters based on usage conditions, apply current device usage conditions from the device to the predictive model to determine recommended device settings, and change current device settings based on the recommended device settings.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
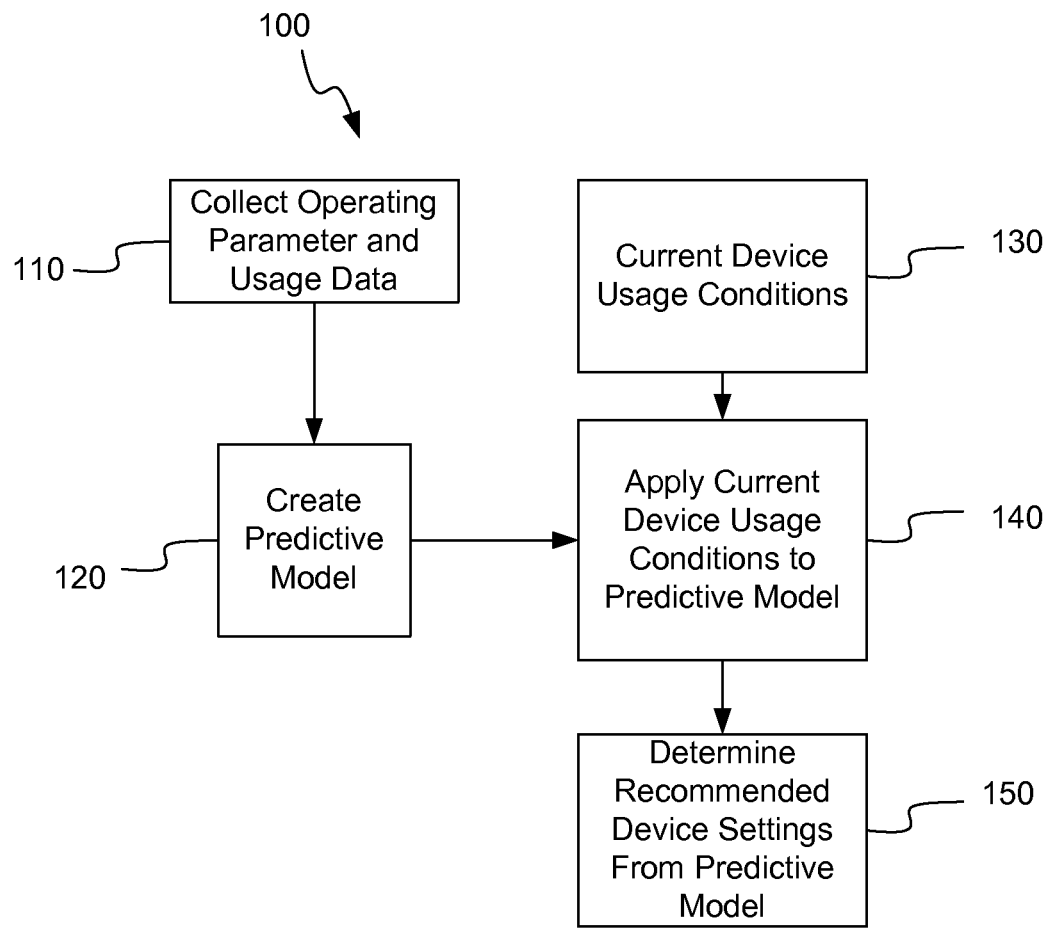
FIG. 1 is a block diagram of an example of a method of recommending settings according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a method 100 of recommending device settings according to an embodiment is shown. The method 100 may be performed using a device having computing functionality (e.g., server, workstation, desktop computer, personal digital assistant/PDA, notebook computer, smart tablet, global positioning system (GPS) navigation system), communications functionality (e.g., wireless smart phone), imaging functionality, media playing functionality (e.g., smart television/TV), or any combination thereof. At block 110, a device may, for example, access a knowledge base for collecting operating parameter and usage data. As used herein, the expression, "operating parameter" may relate to a device operation characteristic such as battery life, temperature/humidity tolerant ranges, performance (processor's clock frequencies, current, and voltages), GPS acquisition time, video load time, audio or video performance, etc. A device usage condition may be a characteristic such as the age of the device, the local environmental conditions, the number and complexity of programs being run by the device, etc. Device settings may be configuration parameters that are variable such as, for example, reserving a period of time for emergency use only when the battery reaches a certain threshold level, shutting down a device above a set temperature. These settings may be automatically set or set by a user of the device.

The knowledge base may be, for example, one or more databases on a network such as the Internet. In a further example, the knowledge base may be one or more databases (such as forum, wiki, etc.) associated with one or more social media sites. For example, users may post information about device operating parameters and usage conditions. In another example, devices that include sensors to record device operating parameters and usage conditions may upload that data to a database, such as a manufacturer's database, a mobile carrier's database, or a database associated with social media so that users of the same or similar devices may be able to determine recommended device settings based on the data.

By analyzing the collected data, a predictive model is created at illustrated block 120 to estimate predicted operating parameters based on usage conditions. Each device (e.g., APPLE 6 vs. NEXUS 5 2012), or a parameter (e.g., power vs. GPS) may need one predictive model that does the best prediction for the device or operating environment, which may be different from others. Likewise, different predictive models may be used for different devices or parameters, for example, one may use a linear regression model, while the other may use a logistic model, depending on the accuracy of the prediction. For example, patterns may emerge upon collecting data that indicates that a predictive model may be created through a matrix pattern of operating parameters corresponding to one or more usage conditions. An example of such a matrix pattern is indicated in Table I below for the battery life of a mobile smart phone as a function of its age and features that are operating:

TABLE I

| Usage Condition | Age (years) | | | |
|---|---|---|---|---|
| | 0 (new) | 1 | 2 | 3 |
| Voice, SMS, Audio | 6 | 5 | 4 | 3 |
| +Flash, Camera, MMS | 4 | 3.5 | 3 | 2.5 |
| +GPS, Video Conference | 3 | 2.5 | 2 | 1.5 |

It should be noted that the data in Table 1 is just one set of example data. It can be safely assumed that large amounts of data can be collected so the data size is large enough for establishing a statistic model and calculating the accuracy.

Alternatively, the collected data may indicate that a more complex predictive model is to be used and a statistical regression analysis of the data may be performed. For an operating parameter that is a function of one or more usage conditions (variables) a model of the form of the following multiple linear regression may be used in finding the most accurate model determined statistically:

$$Y = b_0 + b_1 X_1 + b_2 X_2 + b_3 X_3 + b_4 X_4$$

Where Y=battery life
$X_1$=age of a device
$X_2$=average operation temperature
$X_3$=time (hours) GPS runs per day on average
$X_4$=time (hours) flash is up and running per day, on average The above model describes how mean battery life for the device can be changed by the age of the device, average operating temperature, average hours the GPS runs per day and average hours that flash runs per day in the device. The parameters $b_0, b_1, b_2, b_3, b_4$ are determined by statistic inference (for example, least squares method) using the data collected.

It should be noted that not all parameter data may appear in the model selected if, for example, in the above example, it is found that the average hours the flash runs per day is a minor factor (b4 is near 0), then it can be ignored in the model. Various other models may be used in the prediction (e.g., multiple linear regression, multiple non-linear regression, etc.), with the best model having the highest statistical accuracy being used in the actual prediction. Also, as the amount of data increases, a different model may appear to be more accurate than the current one for the same prediction, so the prediction can switch to use the better model. Furthermore, the resulting predictive model may only be applicable to one particular device, and not be a valid, general model for other devices (e.g., model for battery drain of device A can be vastly different from the model of device B).

Note that the data collection and analysis using the selected model may be performed by any device with computing functionality. Thus, the data collection and analysis may be performed by a remote computer that can communicate with the device or the computer may be a processor within the device itself At illustrated block 130, current device usage conditions may be determined. At illustrated block 140, the current device usage conditions are applied to the predictive model that was created in block 120. By applying the current device usage settings to the predictive model, recommended device settings may be determined in block 150. The recommended device settings may be automatically applied to a device or may be suggested to the user who changes the device settings based on the recommendations.

Figure 2:
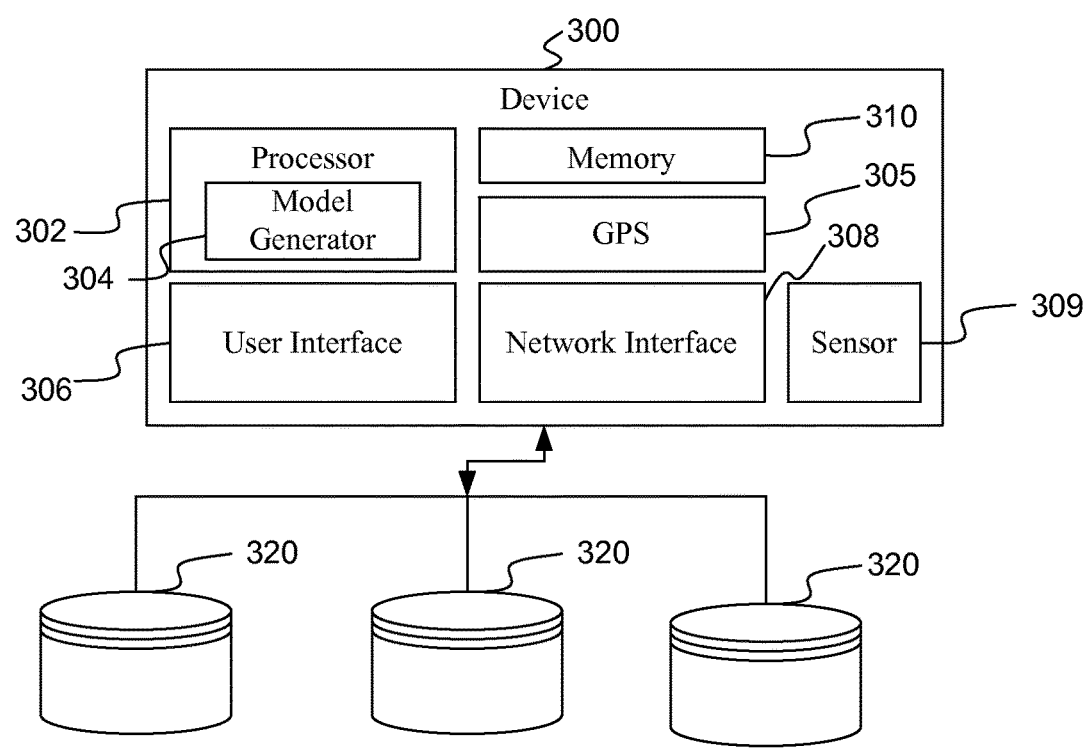
FIG. 2 is a block diagram of an example of a device according to an embodiment.

FIG. 2 shows a device 300 that may be used to recommend settings as described herein. In the illustrated example, the device 300 includes a processor 302 that includes a predictive model generator 304 configured to implement one or more aspects of the method 100 (FIG. 1), already discussed. (Alternatively, a predictive model generator may be included in a remote computer and the results communicated to the device 300). The illustrated device 300 further includes memory 310 (e.g., non-volatile memory/NVM, volatile memory) optionally including one or more of local and remote memory. The device 300 may optionally include a GPS 305, a user interface 306, and a network interface 308 for access to a network (not shown) such as the Internet. A sensor 309 may optionally be included in order to record operating parameters and usage conditions of the device 300 that may be uploaded to databases.

One or more remote databases 320 that store operating parameters and usage conditions for a variety of devices are located on the computer network. The network interface 308 may provide access to the remote databases 320 that include the data for creating the predictive model. Through the user interface 306, recommended device settings may be communicated to the user who may implement them manually or automatically.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A method to determine device settings comprising:
collecting operating parameter and usage condition data for a plurality of electronic devices from one or more databases wherein the operating parameters are functions of the usage conditions;
analyzing the data to estimate predicted operating parameters based on usage conditions, wherein a first predicted operating parameter is estimated from a plurality of distinct combinations of usage conditions formed from a plurality of two or more usage conditions, and wherein a second predicted operating parameter is estimated from a weighted usage condition;
applying current device usage conditions collected by a sensor from a current device to determine recommended device settings; and
changing current device settings based on the recommended device settings.

2. The method of claim 1, further comprising uploading current device operating parameters and current device usage conditions from the sensor to a remote database.

3. The method of claim 1, wherein the one or more databases are associated with social media.

4. The method of claim 1, wherein the operating parameters are selected from one or more of battery life, operating temperature range, operating humidity range, GPS acquisition time, audio or video performance, temperature, or download speed and the usage conditions are selected from one or more of device age, number of simultaneously executing applications, or humidity.

5. The method of claim 1, wherein the weighted usage condition is selected from one or more of a weighted age, a weighted operation temperature, or a weighted component runtime.

6. The method of claim 5, wherein the weighted component runtime is selected from one or more of a weighted GPS runtime or a flash runtime.

7. The method of claim 6, wherein the weighted GPS runtime includes average hours a GPS runs per day.

8. The method of claim 1, wherein the plurality of distinct combinations of usage conditions includes a first combination including two or more relatively low resource intensive usage conditions, a second combination including two or more relatively moderate resource intensive usage conditions, and a third combination including two or more relatively high resource intensive usage conditions.

9. The method of claim 8, wherein the first combination includes a voice usage condition and an audio usage condition, wherein the second combination includes a flash usage condition and a camera usage condition, and wherein the third combination includes a GPS usage condition and a video conference usage condition.

10. The method of claim 1, wherein at least one predicted operating parameter is estimated based on a hierarchy of the plurality of distinct combinations of usage conditions.

11. The method of claim 10, wherein the hierarchy includes a first combination of usage conditions at an upper level of the hierarchy, a second combination of usage conditions at an intermediate level of the hierarchy, and a third combination of usage conditions at a lower level of the hierarchy.

12. The method of claim 10, wherein the at least one predicted operating parameter is estimated based on the hierarchy as a function of values of a reference usage condition.

13. The method of claim 1, wherein at least one predicted operating parameter is estimated based on the plurality of distinct combinations of usage conditions as a function of values of a reference usage condition.

14. A computer program product to determine device settings, the computer program product comprising a non-transitory computer readable storage medium having program instructions embodied therewith, the program instructions executable by a computer to cause the computer to:
collect operating parameter and usage condition data for a plurality of electronic devices from one or more databases;
analyze the data to estimate predicted operating parameters based on usage conditions, wherein a first predicted operating parameter is to be estimated from a plurality of distinct combinations of usage conditions formed from a plurality of two or more usage conditions, and wherein a second predicted operating parameter is to be estimated from a weighted usage condition;
apply current device usage conditions collected by a sensor from the device to determine recommended device settings; and
change current device settings based on the recommended device settings.

15. The computer program product of claim 14, wherein the operating parameters are functions of the usage conditions.

16. The computer program product of claim 14, wherein the device is a portable computing device.

17. The computer program product of claim 14 wherein the computer is a processor within the device.

18. The computer program product of claim 14, wherein the program instructions are executable to cause the sensor to upload current device operating parameters and current device usage conditions to a remote database.

19. The computer program product of claim 14, wherein the one or more databases are associated with social media.

20. The computer program product of claim 14, wherein the operating parameters are selected from one or more of battery life, operating temperature range, operating humidity range, GPS acquisition time, audio or video performance, or download speed and the usage conditions are selected from one or more of device age, number of simultaneously executing applications, temperature, or humidity.

* * * * *